United States Patent
Sadakane et al.

(10) Patent No.: US 7,939,973 B2
(45) Date of Patent: May 10, 2011

(54) CANNED LINEAR MOTOR ARMATURE AND CANNED LINEAR MOTOR

(75) Inventors: Kenichi Sadakane, Kitakyushu (JP); Toshikazu Hamao, Kitakyushu (JP); Mitsuhiro Matsuzaki, Kitakyushu (JP)

(73) Assignee: Kabushiki Kaisha Yaskawa Denki, Fukuoka (JP)

( * ) Notice: Subject to any disclaimer, the term of this patent is extended or adjusted under 35 U.S.C. 154(b) by 241 days.

(21) Appl. No.: 11/911,009

(22) PCT Filed: Mar. 24, 2006

(86) PCT No.: PCT/JP2006/305925
§ 371 (c)(1),
(2), (4) Date: Oct. 9, 2007

(87) PCT Pub. No.: WO2006/109510
PCT Pub. Date: Oct. 19, 2006

(65) Prior Publication Data
US 2009/0015076 A1    Jan. 15, 2009

(30) Foreign Application Priority Data
Apr. 12, 2005    (JP) ................................. 2005-114659

(51) Int. Cl.
*H02K 41/02* (2006.01)
*H02K 41/03* (2006.01)
(52) U.S. Cl. ............... 310/12.23; 310/12.21; 310/12.27; 310/71
(58) Field of Classification Search ............... 310/12, 310/71, 12.01, 12.21, 12.23, 12.27, 12.33; 156/329; H02K 41/00, 41/02, 41/03
See application file for complete search history.

(56) References Cited

U.S. PATENT DOCUMENTS

| | | | | |
|---|---|---|---|---|
| 5,470,607 A * | 11/1995 | Odashima et al. | ............ | 427/97.3 |
| 6,084,319 A * | 7/2000 | Kamata et al. | ............. | 310/12.29 |
| 6,287,677 B1 * | 9/2001 | Ishihara et al. | ............. | 428/292.1 |
| 6,297,570 B1 * | 10/2001 | Matscheko | ................ | 310/12.02 |
| 6,639,333 B1 * | 10/2003 | Kamata et al. | ............. | 310/12.29 |
| 7,591,973 B2 * | 9/2009 | Takano et al. | ................. | 264/320 |
| 7,663,270 B2 * | 2/2010 | Sadakane et al. | .......... | 310/12.29 |
| 2002/0036446 A1 * | 3/2002 | Toda et al. | .................... | 310/328 |

(Continued)

FOREIGN PATENT DOCUMENTS

JP    3-178507 A    8/1991

(Continued)

OTHER PUBLICATIONS

Chinese Office Action dated Jul. 31, 2009, English language translation.

Primary Examiner — Quyen Leung
Assistant Examiner — Terrance Kenerly
(74) Attorney, Agent, or Firm — Sughrue Mion, PLLC

(57) ABSTRACT

A canned linear motor armature comprising an armature winding constituted by a coil group including a plurality of formed coils formed in a flat plate shape. A metal-made chassis is provided to surround the armature winding by a frame-like shape. A can hermetically closes two opening portions of the chassis. The coil group is interposed by a wiring board having a wiring portion and a resin-made frame of a bath tub shape. The frame is opened only at a face side of the wiring board. A periphery of the formed coils surrounded by the wiring board and the frame is configured to be injection-molded by a mold or a potting resin.

4 Claims, 4 Drawing Sheets

U.S. PATENT DOCUMENTS

| | | |
|---|---|---|
| 2003/0141769 A1 | 7/2003 | Kubo |
| 2003/0230941 A1* | 12/2003 | Jacobs .......................... 310/12 |
| 2004/0032170 A1* | 2/2004 | Tamai et al. .................. 310/13 |
| 2004/0068036 A1* | 4/2004 | Halladay et al. ............. 524/439 |
| 2004/0080217 A1* | 4/2004 | Ota et al. ...................... 310/12 |
| 2004/0091687 A1* | 5/2004 | Kondo et al. ................. 428/209 |
| 2005/0017383 A1* | 1/2005 | Shimizu et al. .............. 264/1.24 |
| 2006/0035088 A1* | 2/2006 | Takano et al. ................ 428/413 |
| 2007/0252445 A1* | 11/2007 | Shinohira et al. ............. 310/12 |

FOREIGN PATENT DOCUMENTS

| | | |
|---|---|---|
| JP | 2000-358351 A | 12/2000 |
| JP | 2002-325420 A | 11/2002 |
| JP | 2003-224961 A | 8/2003 |
| JP | 2004-312877 A | 11/2004 |
| WO | WO2004048435 * | 6/2004 |

* cited by examiner

CANNED LINEAR MOTOR ARMATURE AND CANNED LINEAR MOTOR

TECHNICAL FIELD

The present invention relates to a canned liner motor armature and a canned linear motor used for feeding a table of a semiconductor fabricating apparatus or a machine tool and requesting a reduction in a temperature rise and a long period insulation reliability of a linear motor main body.

BACKGROUND ART

FIG. 7 is a perspective view of a total of a general canned linear motor common to the invention and a background art.

In FIG. 7, numeral 1 designates a moving piece, numeral 2 designates a field yoke, numeral 3 designates a permanent magnet, numeral 4 designates a field yoke support, numeral 5 designates a stator, numeral 6 designates a can, numeral 7 designates an armature winding, numeral 8 designates a refrigerant supply port, numeral 9 designates a refrigerant discharge port, numeral 10 designates a casing, numeral 20 designates a bolt for fixing the can, numeral 12 designates a cover containing a lead wire, numeral 15 designates a connector.

The moving piece 1 on one side is constituted by two of the field yokes 2 in a flat plate shape, the permanent magnets 3 attached to surfaces of the respective field yoke 2, and a total of 4 pieces of the field yoke supports 4 as a whole inserted to between the two field yokes 2, and is provided with a hollow space portion both ends of which are opened. Further, the permanent magnets 3 is constituted by arranging to align a plurality of magnets contiguously on the field yoke 2 such that polarities thereof alternately differ. Further, the moving piece 1 is supported by a linear guide comprising a slider and a guide rail, not illustrated, and using balls or a static pressure bearing guide or the like.

A canned linear motor armature constituting the stator 5 on other side is constituted by the metal-made casing 10 having a frame-like shape inside of which is hollowed, the can 6 in a plate-like shape constituting an outer shape of the casing 10 for hermetically closing the two opening portions of the casing 10, the bolt screw 20 for fixing the can 6 to the casing 10, and the 3 phase armature winding 7 arranged at a hollow space of the casing 10. Further, the armature winding 7 is unitized by molding a coil group comprising a plurality of formed coils and the background art will be specifically described later as follows. Further, the armature winding 7 is designated to differentiate as notation 72 in the background art and notation 71 in the invention.

Next, an explanation will be given of a specific structure of the canned linear motor armature in reference to FIG. 4 through FIG. 6. FIG. 4 is a side sectional view of the canned linear motor armature of the background art taken along a line A-A of FIG. 7, FIG. 5 is a side sectional view of an armature winding portion of the background art shown in FIG. 4. FIG. 6 is a side sectional view of the connector portion of the background art shown in FIG. 4.

First, the armature winding portion 72 of the background art will be explained in reference to FIG. 5. A plurality of formed coils 72c formed in a flat plate shape is soldered and fixedly arranged onto a wiring board 72a for connecting to outside of the armature as a power line or a signal line, and a surrounding thereof is covered by a resin-made frame 72b and a resin-made cover 72d. An air gap portion at a periphery of the formed coil 72c surrounded thereby is injection-molded by a mold 21 or a potting resin (not illustrated) with an object of promoting an insulation reliability of the formed coil 72c against a refrigerant.

Next, the connector of the background art will be explained in reference to FIG. 6.

A lead wire 15c led out from the wiring board 72a is soldered to a hermetic seal 15a for connecting a power line or a signal line from the wiring board 72a to outside of the armature, and a wiring portion 15d thereof is injection-molded by a high viscosity resin 15b with the object of promoting the insulation reliability of the formed coil 72c against the refrigerant.

An explanation will be given of integration of the armature using the armature winding portion 72 and the connector 15 in reference to FIG. 4.

The armature winding portion 72 is fixed to a main frame 11 by using a screw or the like, not illustrated and the connector 15 is fixed thereto by laser welding A high viscosity resin 19 is filled to an air gap portion at a periphery of a connecting portion 72e of the armature winding portion 72 and the wiring portion 15d of the connector 15 with the object of promoting the insulation reliability of the formed coil 72c against the refrigerant. Further, a first cover 13 is fixed to the wiring portion 72e of the armature winding portion 72 by using an adhering agent or the like, and the second cover 12 is fixed to the wiring portion 15d of the connector 15 by laser welding. The can 6 is fixed to a position capable of ensuring the refrigerant paths for making the refrigerant flow at a surface and a rear face of the armature winding portion 72 by interposing an O ring 16 with an object of preventing leakage of the refrigerant to outside.

By making three phase alternating currents in accordance with electric relative positions flow to the canned linear motor armature constituted in this way, a thrust is generated at the moving piece, not illustrated, by being operated with a magnetic field produced by the permanent magnet, not illustrated. At this occasion, the formed coil 72c generating heat by a copper loss is cooled by the refrigerant flowing in the refrigerant paths 17, and therefore, a temperature rise at the surface of the can 6 can be restrained (refer to, for example, Patent References 1 through 3).

Patent Reference 1: Japanese Patent No. 3592292
Patent Reference 2: JP-A-2003-224961
Patent Reference 3: JP-A-2004-312977

DISCLOSURE OF THE INVENTION

Problems that the Invention is to Solve

According to the canned linear motor armature of the background art, the following problems are posed.

(1) Although at the armature winding portion 72, the wiring board 72a and the resin-made frame 72b and the resin-made cover 72d are fixed by using an adhering agent or the like, the air gap portion is ensured at the surrounding of the formed coil 72c, and the air gap portion is injection-molded by a mold or a potting resin, a positioning operation in adhering to fix the resin-made frame 72b and the resin-made cover 72d is difficult, further, there is a case in which insulation deterioration or insulation breakdown is brought about from an interface between constituting parts of the resin-made frame 72h and the resin-made cover 72d.

(2) Although at the connector 15, the wiring portion 15d of the hermetic seal 15a is injection-molded by the high viscosity resin 15b, since the resin used is provided with the high viscosity, an operability in injection molding is deteriorated, air bubbles or the like are frequently involved, and therefore, there is a case in which insulation deterioration or insulation breakdown is brought about.

(3) Although the air gap portion at the surrounding of the wiring portion 72e of the armature winding portion 72 and the wiring portion 15d of the connector 15 is filled with the high viscosity resin 19, since the resin used is provided with the high viscosity, the operability in tilling is deteriorated, air bubbles or the like are frequently involved, and therefore, there is a case in which insulation deterioration or insulation breakdown is brought about.

The invention has been carried out in view of the problems and it is an object thereof to provide a canned linear motor armature and a canned linear motor reducing interfaces by reducing a number of parts of constituting members of an armature winding portion, further, capable of firmly carrying out injection molding and filling without involving air bubbles or the like by promoting an operability of injection molding and filling and having a high long period insulation reliability of an armature winding against a refrigerant.

Means for Solving the Problems

In order to resolve the above-described problems, the invention is constituted as follows.

The invention is a canned linear motor armature including an armature winding constituted by a coil group comprising a plurality of formed coils formed in a flat plate shape, a metal-made casing provided to surround the armature winding by a frame-like shape, and a can hermetically closing two opening portions of the casing, wherein the coil group is constituted by being interposed by a wiring board and a resin-made frame of a bath tub shape and injection-molded by a mold or a potting resin.

Further, a portion wired with a connector for connecting from the canned linear motor armature to outside of the armature as a power line or a signal line is constituted by being injection-molded by a mold or a potting resin having a viscosity at an operating temperature equal to or smaller than 30 Pa·s, a usable time period equal to 0.1 through 24 hours, and an elastic modulus equal to or smaller than 3,000 MPa.

Further, a wiring portion for connecting from the wiring board to outside of the wiring board as a power line or a signal line is constituted by being filled by a mold or a potting resin having a viscosity at an operating temperature equal to or smaller than 30 Pa·s, a usable time period equal to 0.1 through 24 hours, and an elastic modulus equal to or smaller than 3,000 MPa.

A field yoke arranged to be opposed to the armature by way of a magnetic air gap and arranged to align with contiguously a plurality of permanent magnets having different polarities alternately, and the hermetic yoke and the armature travel relative to each other by constituting either one of the armature and the field yoke as a stator and constituting other thereof as a moving piece.

ADVANTAGE OF THE INVENTION

According to an aspect of the invention, the coil group is interposed by the wiring board and the resin-made frame having the bath tub shape and injection-molded by the mold or the potting resin, and therefore, interfaces can be reduced by reducing a number of parts of constituting members, an operability of the injection molding can be promoted, and therefore, an insulation reliability of the armature wiring against a refrigerant can be promoted.

According to an aspect of the invention, the portion wired with the connector for connecting from the canned linear motor armature to outside of the armature as the power line or the signal line is injection-molded by the mold or the potting resin having the viscosity at the operating temperature equal to or smaller than 30 Pa·s, the usable time period equal to 0.1 through 24 hours, and the elastic modulus equal to or smaller than 3,000 MPa, and therefore, by using the resin having a low viscosity, the wiring portion can be injection-molded firmly without involving air bubbles or the like by promoting an operability of injection molding, and the insulation reliability of the armature wiring against the refrigerant can be promoted.

According to an aspect of the invention, the wiring portion for connecting from the wiring board to outside of the wiring board as the power line or the signal line is filled by the mold or the potting resin having the viscosity at the operating temperature equal to or smaller than 30 Pa·s, the usable time period equal to 0.1 through 24 hours, and the elastic modulus equal to or smaller than 3,000 MPa, and therefore, by using the resin having the low viscosity, the wiring portion is firmly filled without involving air bubbles or the like by promoting the operability of filling and the insulation reliability of the armature winding against the refrigerant can be promoted.

According to an aspect of the invention, there can be provided the highly reliable canned linear motor in which an insulation resistance of the armature winding against the refrigerant is high, and which is highly reliable by using water having a high cooling function and arranging the armature and the field to be opposed to each other.

Figure 1:
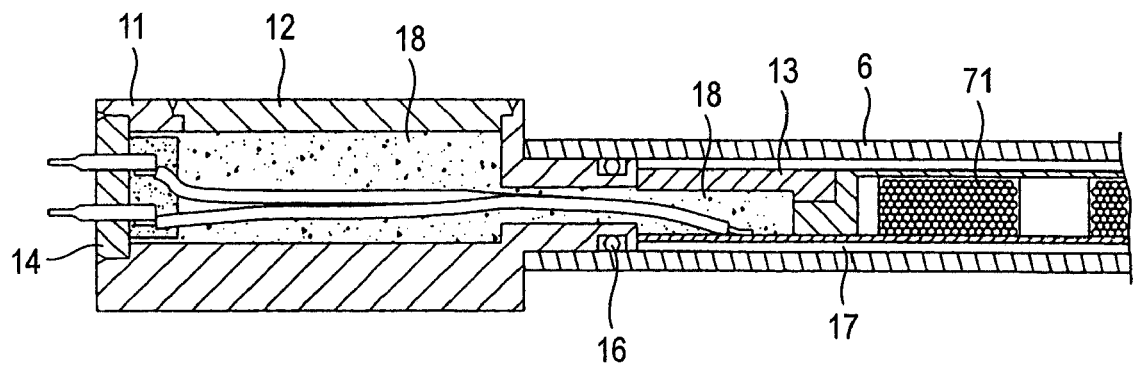
FIG. 1 is a view of a canned linear motor armature showing an embodiment of the invention in correspondence with a side sectional view taken along a line A-A of FIG. 7.

DESCRIPTION OF REFERENCE NUMERALS AND SIGNS 1 moving piece
2 field yoke
3 permanent magnet
4 field yoke support
5 stator
6 can
7 armature winding
71 armature winding (the invention)
71a winding board
71b frame
71c formed coil
71e winding portion
72 armature winding (background art)
72a winding board
72b frame 72c formed coil
72d cover
72e winding portion
8 refrigerant supply port
9 refrigerant discharge port
10 casing
11 main frame
12 second cover
13 first cover
14 connector
14a hermetic seal
14b low viscosity resin
14c lead wire
14d winding portion
15 connector
15a hermetic seal
15b high viscosity resin
15c lead wire
15d winding portion
16 O ring
17 refrigerant path
18 low viscosity resin
19 high viscosity resin
20 bolt screw
21 mold

BEST MODE FOR CARRYING CUT THE INVENTION

An embodiment of the invention will be explained as follows in reference to the drawings.

Embodiment 1

Figure 2:
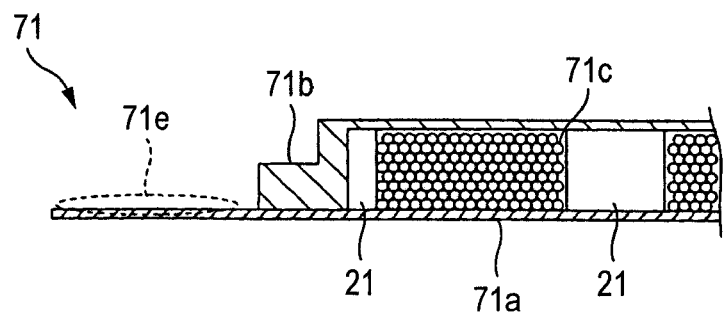
FIG. 2 is a side sectional view of an armature winding portion according to the invention shown in FIG. 1.
Figure 3:
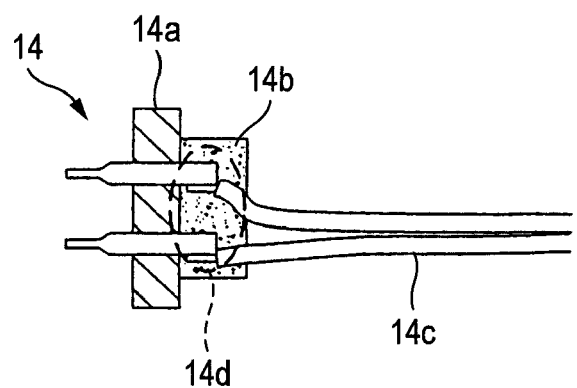
FIG. 3 is a side sectional view of a connector portion of the invention shown in FIG. 1.
Figure 4:
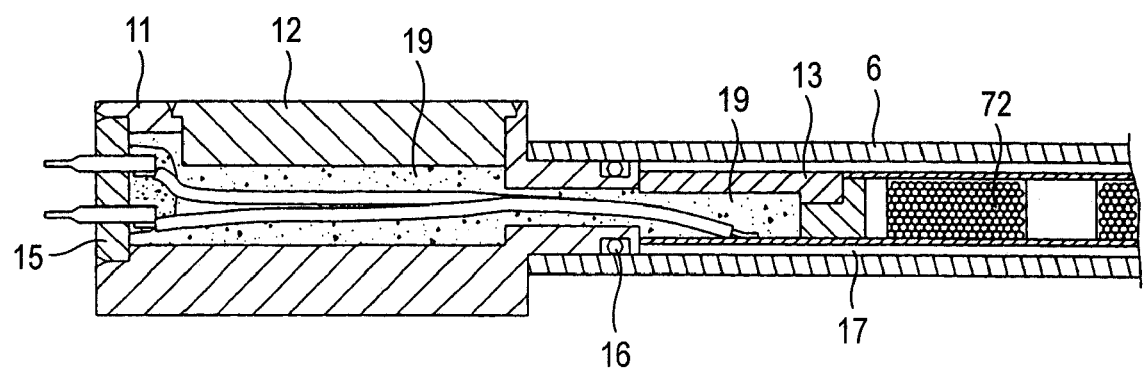
FIG. 4 is a side sectional view of a canned linear motor armature taken along the line A-A of FIG. 7.
Figure 5:
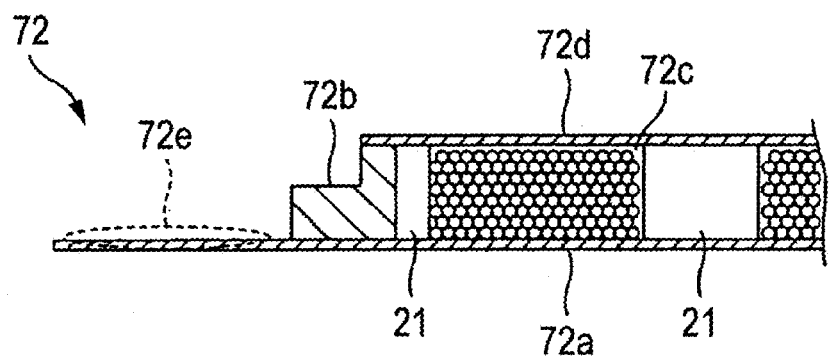
FIG. 5 is a side sectional view of an armature winding portion of a background art shown in FIG. 4.
Figure 6:
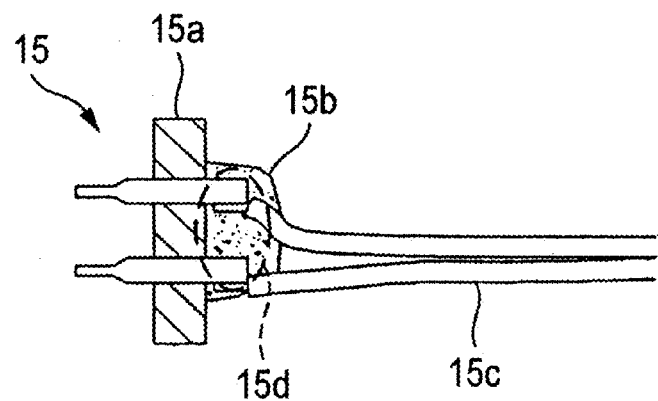
FIG. 6 is a side sectional view of a connector portion of the background art shown in FIG. 4
Figure 7:
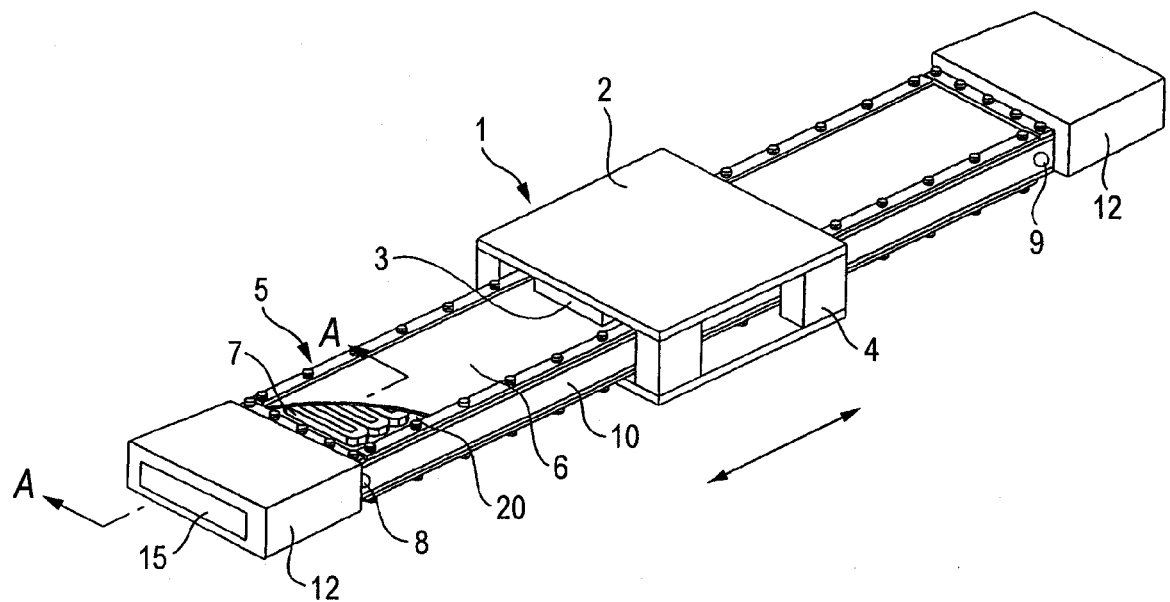
FIG. 7 is a perspective view of a total of a general canned linear motor common to the invention and the background art.

FIG. 1 shows a canned linear motor armature showing an embodiment of the invention in correspondence with the side sectional view taken along the line A-A of FIG. 7. FIG. 2 is a side sectional view of an armature winding portion of the invention shown in FIG. 1, FIG. 3 is a side sectional view of a connector portion of the invention shown in FIG. 1, and a characteristic of the invention is as follows.

First, the armature winding portion 71 of the invention will be explained.

In FIG. 2, a plurality of the formed coils 71c formed in a flat plate shape are soldered and fixedly arranged onto the wiring board 71a for connecting to outside of the armature as a power line or a signal line, and a surrounding thereof is covered by the resin-made frame 71b in a bath tub shape a surrounding of which is opened only at a face side of the wiring board 71a. The mold 21 or a potting resin (not illustrated) is injection-molded to an air gap portion at a periphery of the formed coil 71c surrounded by the wiring board 71a and the resin-made frame 71b in the bath tub shape with an object of promoting an insulation reliability of the formed coil 71c against a refrigerant. For example, With epoxy resin is injection-molded in vacuum, the air gap portion is completely replaced by the epoxy resin. Interfaces can be reduced by reducing a number of parts of constituting members, further, an operability of injection molding can be promoted, and therefore, the insulation reliability of the armature wiring against the refrigerant can be promoted.

Next, the connector portion of the invention will be explained.

In FIG. 3, the lead wire 14c led out from the wiring board 71a is soldered to the hermetic seal 14a for connecting a power line or a signal line from the wiring board 71a to outside of the armature and the wiring portion 14d is injection-molded by using a mold or a potting resin, particularly, the low viscosity resin 14b with an object of promoting the insulation reliability of the formed coil 71c against the refrigerant. For example, the injection molding is carried out by silicone of a viscosity at an operating temperature equal to or smaller than 30 Pa·s, a usable time period of 0.1 through 24 hours, an elastic modulus equal to or smaller than 3,000 MPa. Injection molding can firmly be carried out without involving air bubbles or the like by promoting an operability of injection molding by using the low viscosity resin and the insulation reliability of the armature winding against the refrigerant can be promoted.

An explanation will be given of integration of an armature using the armature winding portion 71 and the connector 14 in reference to FIG. 1.

The main frame 11 is fixed with the armature winding portion 71 by using a screw or the like, not illustrated, and the connector 14 by laser welding. The low viscosity resin 18 is filled to the air gap portion at a periphery of the wiring portion 71e of the armature wiring portion 71 and the wiring portion 14d of the connector 14 with the object of promoting the insulation reliability of the formed coil 71c against the refrigerant. For example, injection molding is carried out by silicone having the viscosity at the operating temperature equal to or smaller than 30 Pa·s, the usable time period of 0.1 through 24 hours, and the elastic modulus equal to or smaller than 3,000 MPa. By using the low viscosity resin, the air gap can firmly be filled without involving air bubbles or the like by promoting the operability of the injection molding and the insulation reliability of the armature winding against the refrigerant can be promoted. The first cover 13 is fixed to the wiring portion 71e of the armature wiring portion 71 by using an adhering agent or the like, further, the second cover 12 is fixed to the wiring portion 14d of the connector 14 by laser welding. It can be confirmed by a single or a plurality of holes provided at the first cover 13 that the low viscosity resin 18 is firmly filled to the air gap portion at inside of the canned linear motor armature at which the refrigerant does not pass, and the insulation reliability of the armature winding against the refrigerant can be promoted.

The can 6 is fixed to a position capable of ensuring the refrigerant paths 17 for making the refrigerant flow at the surface and the rear face of the armature winding portion 7 by interposing the O ring 16 with an object of preventing leakage of the refrigerant to outside.

In the canned linear motor armature constituted in this way, by making three phase alternating currents in accordance with electric relative positions flow to the formed coil 71c, a thrust is generated at a moving piece, not illustrated, by operating with a magnetic field produced by a permanent magnet, not illustrated. At this occasion, the formed coil 71c generating heat by a copper loss is cooled by the refrigerant flowing at the refrigerant paths 10, and therefore, a temperature rise at the surface of the can 6 can be restrained.

The invention claimed is:
1. A canned linear motor armature comprising:
an armature winding constituted by a coil group including a plurality of formed coils formed in a flat plate shape;
a metal-made chassis provided to surround the armature winding by a frame-like shape; and
a can hermetically closing two opening portions of the chassis,
wherein the coil group is interposed by a wiring board having a wiring portion and a resin-made frame of a bath tub shape, the frame being opened only at a face side of the wiring board, and a periphery of the formed coils surrounded by the wiring board and the frame is config- ured to be injection-molded by a mold or a potting resin with an object of promoting an insulation reliability of the formed coils against a refrigerant, and wherein a wiring portion with a connector for connecting from the canned linear motor armature to an outside of the armature as a power line or a signal line is injection-molded by a mold or a potting resin having a viscosity at an operating temperature equal to or smaller than 30 Pa·s, a usable time period equal to 0.1 through 24 hours, and an elastic modulus equal to or smaller than 3,000 MPa.

2. A canned linear motor armature comprising:

an armature winding constituted by a coil group including a plurality of formed coils formed in a flatplate shape;

a metal-made chassis provided to surround the armature winding by a frame-like shape; and a can hermetically closing two opening portions of the chassis, wherein the coil group is interposed by a wiring board having a wiring portion and a resin-made frame of a bath tub shape, the frame being opened only at a face side of the wiring board, and a periphery of the formed coils surrounded by the wiring board and the frame is configured to be injection-molded by a mold or a potting resin with an object of promoting an insulation reliability of the formed coils against a refrigerant, and wherein a wiring portion for connecting from the wiring board to an outside of the wiring board as a power line or a signal line is filled by a mold or a potting resin having a viscosity at an operating temperature equal to or smaller than 30 Pa·s, a usable time period equal to 0.1 through 24 hours, and an elastic modulus equal to or smaller than 3,000 MPa.

3. A canned linear motor comprising:

a canned linear motor armature; and a field yoke arranged to be opposed to the armature by way of a magnetic air gap and arranged with a plurality of permanent magnets having different polarities contiguously aligned alternately, wherein one of the armature and the hermetic yoke is constituted as a stator, and the other is constituted as a moving piece, the hermetic yoke and the armature relatively travel, the canned linear motor armature includes:

an armature winding constituted by a coil group including a plurality of formed coils formed in a flat plate shape;

a metal-made chassis provided to surround the armature winding by a frame-like shape; and a can hermetically closing two opening portions of the chassis, the coil group is interposed by a wiring board having a wiring portion and a resin-made frame of a bath tub shape, the frame being opened only at a face side of the wiring board, and a periphery of the formed coils surrounded by the wiring board and the frame is configured to be injection-molded by a mold or a potting resin with an object of promoting an insulation reliability of the formed coils against a refrigerant, and wherein a wiring portion with a connector for connecting from the canned linear motor armature to an outside of the armature as a power line or a signal line is injection-molded by a mold or a potting resin having a viscosity at an operating temperature equal to or smaller than 30 Pa·s a usable time period equal to 0.1 through 24 hours, and an elastic modulus equal to or smaller than 3,000 MPa.

4. A canned linear motor comprising:

a canned linear motor armature; and a field yoke arranged to be opposed to the armature by way of a magnetic air gap and arranged with a plurality of permanent magnets having different polarities contiguously aligned alternately, wherein one of the armature and the hermetic yoke is constituted as a stator, and the other is constituted as a moving piece, the hermetic yoke and the armature relatively travel, the canned linear motor armature includes:

an armature winding constituted by a coil group including a plurality of formed coils formed in a flat plate shape;

a metal-made chassis provided to surround the armature winding by a frame-like shape; and a can hermetically closing two opening portions of the chassis, the coil group is interposed by a wiring board having a wiring portion and a resin-made frame of a bath tub shape, the frame being opened only at a face side of the wiring board, and a periphery of the formed coils surrounded by the wiring board and the frame is configured to be injection-molded by a mold or a potting resin with an object of promoting an insulation reliability of the formed coils against a refrigerant, and wherein a wiring portion for connecting from the wiring board to an outside of the wiring board as a power line or a signal line is filled by a mold or a potting resin having a viscosity at an operating temperature equal to or smaller than 30 Pa·s, a usable time period equal to 0.1 through 24 hours, and an elastic modulus equal to or smaller than 3,000 MPa.

\* \* \* \* \*